Jan. 27, 1970   H. J. KALDENBERG   3,491,780
SELF-CLEANING FILTER FOR DISHWASHER
Filed Dec. 11, 1967
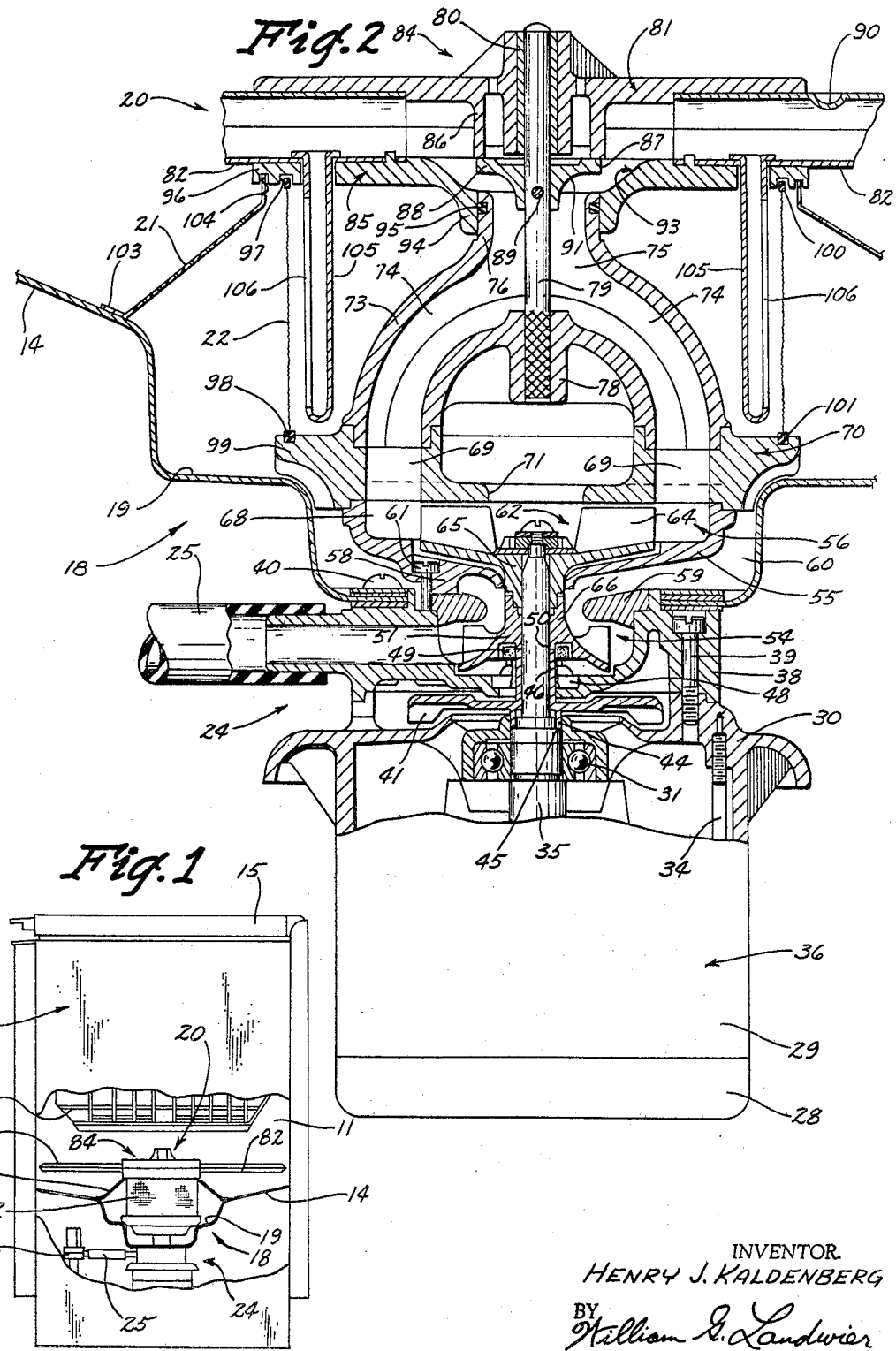
INVENTOR.
HENRY J. KALDENBERG
BY
William G. Landwier
AGENT

United States Patent Office 3,491,780
Patented Jan. 27, 1970

3,491,780
SELF-CLEANING FILTER FOR DISHWASHER
Henry J. Kaldenberg, Des Moines, Iowa, assignor to The Maytag Company, Newton, Iowa, a corporation of Delaware
Filed Dec. 11, 1967, Ser. No. 689,630
Int. Cl. B08b 3/02; B01d 23/06
U.S. Cl. 134—104
9 Claims

ABSTRACT OF THE DISCLOSURE

A self-cleaning filtering system for a dishwasher arranged coaxially with the fluid recirculating spray arm and including a filter screen disposed upstream from the recirculating pump ingress and further including an auxiliary filter cleaning spray means in fluid communication with the recirculating spray arm and rotatable therewith for projecting fluid onto the filter screen from the downstream side and dislodging particles collected on the upstream side thereof.

BACKGROUND OF THE INVENTION

Field of the invention

This invention relates to a liquid distribution system for a dishwashing apparatus and more particularly to an improved self-cleaning filter arrangement.

Description of the prior art

It is common to provide a recirculation of the washing fluid in dishwashers and it has been found desirable to filter the fluid for preventing redeposition of particles on the articles being washed and for permitting use of small fluid distribution holes to achieve a high pressure, high velocity fluid spray. It is important to remove even the fine particles from the fluid so that the spray openings do not become clogged. A fine mesh screen is thus desirable.

A self-cleaning filter arrangement including a fine mesh screen is shown in United States Patent 3,090,391 May 21, 1963 to H. J. Kaldenberg et al. This device includes a self-cleaning arrangement having a separate filter housing and a system of connecting fluid conduits for effecting the recirculation of fluids, the filtering of the fluid, and the cleaning of the filter. Another filtering arrangement is shown in U.S. 3,323,529 issued June 6, 1967 to R. C. Geiger et al., and discloses an arrangement for filtering a portion of the fluid through a large mesh screen and a fine mesh screen wherein the filter screens are arranged coaxially to the fluid recirculating spray arm.

SUMMARY OF THE INVENTION

It is an object of this invention to provide an improved self-cleaning filtering system to achieve a thorough and continuous filtering of the fluid and cleaning of the filter screen.

It is a further object of this invention to provide an improved self-cleaning filtering system including a fine mesh filter screen and auxiliary filter cleaning spray means arranged coaxially with the recirculating spray arm wherein the filter screen and auxiliary filter cleaning spray means are relatively rotatable for achieving effective cleaning of the filter screen.

It is still a further object of this invention to provide an improved self-cleaning filtering system including a fine mesh filter screen arranged coaxially to the recirculating spray arm and further including an auxiliary filter cleaning spray means rotatable with the recirculating spray arm.

These objects are achieved in the filtering system of the instant invention wherein a fine mesh filter screen and auxiliary filter cleaning spray means are positioned coaxially to the recirculating spray arm and arranged for relative rotation to achieve cleaning of the filter screen during operation of the recirculating spray arm.

Operation of the device and further objects and advantages thereof will become evident as the description proceeds and from an examination of the accompanying page of drawings which illustrates a preferred embodiment of the invention and in which similar numerals refer to similar parts throughout the two views.

BRIEF DESCRIPTION OF THE DRAWINGS

FIGURE 1 is a side elevational view of a typical dishwashing apparatus embodying the filtering system of the instant invention, and FIGURE 2 is an axial section of a fluid distribution and filtering system embodying the instant invention.

DESCRIPTION OF THE PREFERRED EMBODIMENT

Referring now to the drawings, there is shown a preferred embodiment of the invention adapted to a dishwashing apparatus similar to the basic structure shown in U.S. Patent 3,323,529 and including a cabinet structure 10 defining a washing chamber 11 including a bottom wall 14. Access to the washing chamber 11 is provided by a lid member 15 operable between a horizontal closed position and a vertical open position. Articles to be washed may be supported within the washing chamber 11 by means of one or more racks 16. While a top-loading dishwasher is illustrated, it is to be understood that the instant invention may also be adapted for use on other types of dishwashing machines such as front-opening types.

As best shown in FIGURE 1, the bottom wall 14 of the washing chamber 11 is sloped downwardly toward the center and includes a central sump portion 18 having an intermediate annular step 19. Mounted in the lower portion of the washing chamber 11 adjacent the bottom wall 14 and disposed partly within the sump area 18 is a portion of the fluid recirculating system and filtering system including the recirculating spray arm 20, a first stage filter 21, and a fine mesh filter screen 22.

Mounted directly below the bottom of the sump 18 is a motor driven fluid pumping assembly 24 as will be more fully described hereinafter. Shown also in FIGURE 1 is a drain conduit 25 communicating with an external drain. A selectively energizable valve 26 is in the drain conduit to permit closing of the drain conduit during selected portions of the cycle of operations.

Referring more particularly to FIGURE 2, the motor-pump assembly 24 and the mounting thereof to the sump 18 is shown. The lower motor frame 28 includes a bearing (not shown) and is assembled, with the intermediate frame portion 29, to the upper motor frame 30 including a second bearing 31. A plurality of through bolts 34 extend upwardly from the lower motor frame 28 and are threaded into the upper motor frame 30. The upper and lower bearings rotatably mount the armature and main shaft 35 extending upwardly therefrom.

The motor 36 is in turn mounted or supported from a lower pump housing 38 by a plurality of screw members 39 extending downwardly through the housing 38 and threadingly engageable with the upper motor frame 30. The lower pump housing 38 and motor assembly 36 is in turn supported by the bottom wall 14 of the washing chamber 11 adjacent the sump area 18 by a plurality of screw members 40 extending downwardly from the sump area 18 and threadingly engageable with the lower pump housing 38.

A combination impeller and water slinger 41 is disposed within a chamber defined by the lower pump housing 38 and upper motor frame 30. This combination impeller-slinger 41 is rotationally operable for providing air circulation upwardly through the motor 36 for cooling thereof and for preventing leakage of fluid from the pump housing 38 into the motor 36.

The combination impeller-slinger 41 includes a lower hub 44 which seats against the shoulder 45 of the shaft 35 and also includes a top hub 46 which extends through the shaft seal 48 and ceramic seat 49 to engage a lower hub 50 of the drain pump impeller 51 to locate the drain pump impeller 51 within the lower cavity for drain pump 54.

Located within the sump area 18 is the upper or recirculating pump housing 55 defining a portion of the recirculating pump 56. The upper pump housing 55 is spaced from the bottom of the sump 18 by a number of legs 58 which seat on the annular drain pump cover 59 that is in turn mounted on the lower pump housing 38. This arrangement defines a passageway 60 from the washing chamber 11 into the drain pump 54. A series of uniformly spaced screws 61 extend through the leg members 58 and are threaded into the lower pump housing 38 sandwiching therebetween the drain pump cover 59.

Rotatably mounted within the pump housing 55 is a centrifugal impeller 62 having upwardly extending vanes 64 and rigidly secured to the upper end of the motor shaft 35 for rotation therewith. The bottom hub 65 of the recirculating impeller 62 is drivingly interconnected with the upper hub 66 of the drain pump impeller 51. As a result, the recirculating impeller 62 and the drain impeller 51 are effectively fixed to the motor shaft 35 for common rotation therewith.

Formed within the housing 55 of the recirculating pump 56 is a volute-shaped passageway 68 and constructed so as to change the direction of the water discharged from the recirculating impeller 62 from a radial direction upwardly through a pair of diametrically opposed openings 69 formed within the recirculating pump cover 70 secured to the pump housing 55 by a plurality of screws (not shown) extending downwardly through the cover 70 and engaging with the pump housing 55. Centrally located in the recirculating pump cover 70 is the inlet opening 71 which permits water to flow from the sump area 18 down into the eye of the recirculating impeller 62.

Extending upwardly from the recirculating pump cover 70 at the openings 69 is a manifold 74 which directs the water from the recirculating pump 56 through conduits 74 from which the water flows together in an annular discharge passageway 75 defined by a cylindrical portion 76 extending upwardly from the top of the manifold 73.

Mounted within the hub 78 centrally formed on the underside of the upper portion of the manifold 73 is a lower end of an upwardly extending shaft 79 which rotatably supports a recirculation spray arm 20 by a sleeve type bearing 80 mounted within the top hub member 81 of the recirculating spray arm 20. The recirculating spray arm 20 includes at least two closed-end tubes 82 which extend horizontally from the recirculating spray arm hub assembly 84 and are retained therein by clamping the tubes between the upper and lower hub members 81 and 85 by a series of screws. The recirculating spray arm 20 is supported at the desired elevation on the shaft 79 by a cylindrical sleeve 86 formed as an integral part of the upper hub member 81 and which projects downwardly therefrom to define an annular horizontal bearing surface 87 engageable with a corresponding seat formed on the deflector member 88 secured to the shaft 79 by a pin 89.

The spray tubes 82 are formed with a series of jet openings, such as at 90, for directing the fluid onto the articles being washed with sufficient pressure and velocity and in a direction which will provide a cleansing action while providing a reaction force on the recirculating spray arm 20 to cause rotation thereof.

The bottom surface of the deflector member 88 is provided with an annular curved portion 91 which changes the flow of water through the passageway 75 from an axial direction to a generally radial direction so that the flow of water is directed against the sloping surface 93 formed within the lower hub member 85 of the spray arm hub 84. This pressure caused by the flow of water against the surface 93 produces a downward reaction force on the hub 84 to firmly engage the sleeve bearing surface 87 with the seat of the deflector member 88 and thereby prevent the recirculating spray arm 20 from rising upwardly off the supporting shaft 79.

A cylindrical annular flange 94 is formed as an integral part of the lower hub member 85 and extends downwardly to surround the upper cylindrical portion 76 of the manifold 73. This annular flange 94 is cooperable with the cylindrical portion 76 through a sealing ring 95 to provide a seal between the recirculating spray arm hub 84 and the upper cylindrical portion 76 of the manifold 73.

The lower hub member 85 includes an annular flange portion 96 that includes a downwardly facing groove 97 spaced above an upwardly facing groove 98 formed in an annular flange 99 of the recirculating pump cover 70. These grooves receive the end rings 100 and 101 of a fine mesh filter screen 22 and position the screen for filtering particles from the water flowing into the inlet 71 or ingress of the recirculating pump 56. In this embodiment the lower end ring 101 is retained in the upwardly facing groove 98 to prevent rotation of the fine mesh screen 22. Disposed outwardly and upstream from the fine mesh screen is a filter plate 21 having relatively larger openings therein and operable for catching articles that may have fallen from the racks 16 and for separating the large particles from the wash fluid. A lower flange 103 of this filter pale 21 rests on the bottom wall 14 of the washing chamber 11 while the upper end is positioned within a second downwardly facing groove 104 formed in the annular flange portion 96 of the lower hub member 85.

Extending downwardly from the recirculating spray arm 20 and disposed inwardly and downstream from the fine mesh screen 22 is a pair of auxiliary spray tubes 105 in fluid communication with the recirculating spray arm and having a longitudinally extending slit or fluid egress 106 in each facing toward the downstream side of the fine mesh filter screen 22. During operation of the recirculating pump 56, a portion of the fluid entering the recirculating spray arms 20 will enter these auxiliary spray tubes 105 and be directed onto the downstream side of the fine mesh filter screen 22 for dislodging particles collected on the upstream side thereof. Rotation of the auxiliary spray tubes 105 with the recirculating spray arm 20 will effect periodic cleaning of all parts of the screen. These filtered particles will fall to the intermediate step area 19 surrounding the flange portion 99 of the recirculating pump cover 70 and be carried through the passageway 60 and drain pump 54 to an external drain by the pumping action of the drain pump 54 during a drain portion of the operating cycle. Further constructional and operational details of the self-cleaning filter system are disclosed in the U.S. Patent 3,090,391 issued to H. J. Kaldenberg et al., and assigned to the assignee of the instant invention.

By way of summary, operation of the fluid recirculating system and the filtering system will be received. During a washing operation the fluid tends to drain into the sump area 18 and is drawn through the filter plate 21 and fine mesh screen 22 into the recirculating pump ingress 71. Fluid is also present in the drain pump 54 but flow from the outlet is prevented by use of a valve 26 in the drain line 25. The fluid is recirculated from the recirculating pump 56 upwardly through the manifold 73 to the recirculating spray arms 20. Concurrently, flow into the auxiliary filter cleaning spray tubes 105 is directed radially outwardly onto the downstream side of the fine mesh filter screen 22 to dislodge particles collected thereon. This operation continues throughout the washing operation.

Upon initiation of the drain operation and actuation of the drain control valve 26, the opening of the drain line 25 permits effective operation of the drain pump 54 for draining the washing chamber 11. Since the recirculating pump 56 continues to operate during the drain operation, cleaning of the fine mesh screen 22 will continue through the initial portion of the drain operation as long as fluid remains in the sump 18 available to the recirculating pump 56. The fluid and particles in the sump area 18 flow through the passageway 60 to the drain pump 54. The fluid and particles are then forced toward the external drain. The continued operation of the auxiliary filter cleaning spray means 105 during the initial portion of the draining operation achieves efficient self-cleaning of the fine mesh filter screen 22 of the particles collected in the foregoing wash period.

It can be seen from the foregoing description that the filtering system of the instant invention provides several desirable improvements. The use of a first stage filter and a second stage filter for effecting filtering of the entire fluid flow therethrough provides assurance that filtering will be effective and without clogging since no large particles may collect on the fine mesh screen and because there is a continuous cleaning action of the fine mesh screen. The coaxial arrangements of the self-cleaning filter with the recirculating spray arm disclosed above is an improved construction. External fluid conduits are thus eliminated and the fluid flow system simplified. In addition, use of the recirculating spray arm for effecting rotation between the screen and the auxiliary filter cleaning spray facilitates improved cleaning action of the screen by the auxiliary spray since the entire portion of the auxiliary spray is useful for cleaning the screen and none is required for rotating the auxiliary spray means.

I claim:

1. In a dishwashing apparatus, the combination comprising: wall means defining a washing chamber for receiving articles to be washed; fluid distribution means including a rotatable spray arm for directing washing fluid onto said articles in said washing chamber; pumping means having an ingress communicating with a lower portion of said washing chamber and an egress communicating with said fluid distribution means and operable for pumping fluids to said spray arm; filter means in said washing chamber interposed in the path of said washing fluids entering said ingress for separating foreign particles from said washing fluid; and auxiliary spray means adjacent to the filter means and in fluid communication with said egress for receiving a portion of the fluid from said pumping means and operable for projecting fluid against said filter means for dislodging foreign particles collected thereon for the cleaning of the filter means, one of said last two named means being connected to and rotatable with said spray arm for effecting relative rotation between said filter means and said auxiliary spray means whereby cleaning of said filter means is effected.

2. In a dishwasher as defined in claim 1 wherein said auxiliary spray means is connected to and rotatable with said spray arm.

3. In a dishwasher as defined in claim 1 where said auxiliary spray means is located at the downstream side of said filter and operable for back washing said filter to remove particles from the upstream surface thereof.

4. In a dishwashing apparatus, the combination comprising: wall means defining a washing chamber for receiving articles to be washed; fluid distribution means including a rotatable spray arm for directing washing fluid onto said articles in said washing chamber; pumping means having an ingress communicating with a lower portion of said washing chamber and an egress communicating with said fluid distribution means and operable for pumping fluids to said spray arm; filter means in the lower portion of said washing chamber interposed in the path of said washing fluids entering said ingress for separating foreign particles from said washing fluid; and auxiliary spray means adjacent to the filter means and in fluid communication with said fluid distribution means and rotatable with said rotatable spray arm for projecting fluids against said filter means for dislodging foreign particles collected thereon for the cleaning of the filter means.

5. In a dishwashing apparatus as defined in claim 4 wherein said filter means includes a substantially cylindrical filter screen disposed coaxially to the axis of rotation of said rotatable spray arm.

6. In a dishwashing apparatus as defined in claim 5 wherein said rotatable spray arm includes a hub member having a portion defining a cover for said filter means.

7. In a dishwashing apparatus as defined in claim 6 wherein said auxiliary spray means includes a spray nozzle depending from said rotatable spray arm for projecting fluids against said filter screen for dislodging particles therefrom.

8. In a dishwashing apparatus having a washing period and a draining period, the combination comprising: wall means defining a washing chamber for receiving articles to be washed; fluid distribution means adjacent to the filter means including a rotatable spray arm for directing washing fluids onto said articles in said washing chamber; a sump portion at the bottom of said washing chamber; recirculation pumping means including an ingress communicating with said sump portion and operable for pumping fluids toward said fluid distribution means; fluid conduit means connecting the egress of said pumping means with said fluid distribution means; filter means disposed at least partially in said sump portion and interposed in the path of said washing fluids entering said ingress for separating particles from said washing fluid; auxiliary spray means adjacent to the filter means for receiving a portion of the fluid in said fluid distribution means and for projecting said portion against said filter means for dislodging particles connected thereon for the cleaning of the filter means, said auxiliary spray means being connected to and rotatably with said spray arm for cleaning said filter means; and drain means in fluid communication with said sump means for conducting the foreign particles and washing fluid to an external drain during said draining period.

9. In a dishwashing apparatus as defined in claim 8 wherein said drain means includes a drain pump and wherein said drain pump is effective for pumping fluids to said external drain only during said draining period and said recirculation pumping means is operable for supplying fluids to said rotatable spray arm and said auxiliary spray means during said washing period and the initial portion of said draining period.

References Cited

UNITED STATES PATENTS

| 2,802,477 | 8/1957 | Levit | 134—111 XR |
| 3,058,479 | 10/1962 | Fay et al. | 134—111 XR |
| 3,090,391 | 5/1963 | Kaldenberg et al. | 134—104 |

FOREIGN PATENTS 730,992   1/1955   Great Britain.

DANIEL BLUM, Primary Examiner

U.S. Cl. X.R.

134—111; 210—167